US012623975B2

(12) United States Patent
Tan

(10) Patent No.: US 12,623,975 B2
(45) Date of Patent: May 12, 2026

(54) HIGH-TEMPERATURE ROLLING PROCESSING METHOD AND PROCESSING DEVICE, AND APPLICATION OF HIGH-TEMPERATURE ROLLING PROCESSING DEVICE

(71) Applicant: Peking University Nanchang Innovation Institute, Jiangxi (CN)

(72) Inventor: Chi Tan, Wuhan (CN)

(73) Assignee: Peking University Nanchang Innovation Institute, Jiangxi (CN)

( * ) Notice: Subject to any disclaimer, the term of this patent is extended or adjusted under 35 U.S.C. 154(b) by 313 days.

(21) Appl. No.: 18/557,649

(22) PCT Filed: Aug. 9, 2022

(86) PCT No.: PCT/CN2022/111119
§ 371 (c)(1),
(2) Date: Oct. 27, 2023

(87) PCT Pub. No.: WO2023/138035
PCT Pub. Date: Jul. 27, 2023

(65) Prior Publication Data
US 2024/0368043 A1 Nov. 7, 2024

(30) Foreign Application Priority Data
Jan. 18, 2022 (CN) .......................... 202210054643.9

(51) Int. Cl.
*B30B 3/00* (2006.01)
*C04B 41/00* (2006.01)

(52) U.S. Cl.
CPC ............ *C04B 41/0081* (2013.01); *B30B 3/00* (2013.01)

(58) Field of Classification Search
CPC .. B30B 3/00; B30B 3/02; C04B 41/00; C04B 41/009; C04B 41/0081; C04B 41/0072; C04B 41/80; C21D 7/13; Y02P 10/20
See application file for complete search history.

(56) References Cited

FOREIGN PATENT DOCUMENTS

| CN | 105445124 A | * | 3/2016 | ............. G01N 3/307 |
| CN | 206109466 U | * | 4/2017 | |
| CN | 111531322 A | * | 8/2020 | ............... B23P 9/02 |

OTHER PUBLICATIONS

English translation of CN 206109466 U—5 pages, retrieved in 2025 (Year: 2025).*
English translation of CN 111531322 A—8 pages, retrieved in 2025 (Year: 2025).*

* cited by examiner

*Primary Examiner* — Jimmy T Nguyen
(74) *Attorney, Agent, or Firm* — The Dobrusin Law Firm, P.C.

(57) ABSTRACT

A high-temperature rolling machining method and processing device, and an application of the high-temperature rolling processing device, the device includes a force loading assembly, a rolling assembly, a temperature control assembly, and a carrying assembly; in the high-temperature rolling machining method, an accurate high-temperature rolling operation can be carried out on the surface of a test piece made of brittle materials such as ceramics by using the processing device, and the mechanical properties and electrical properties of the test piece after rolling treatment are remarkably improved, the thermal conductivity is remarkably reduced, and at the same time, crack initiation in the processing process is avoided.

15 Claims, 4 Drawing Sheets

A

HIGH-TEMPERATURE ROLLING PROCESSING METHOD AND PROCESSING DEVICE, AND APPLICATION OF HIGH-TEMPERATURE ROLLING PROCESSING DEVICE

CROSS-REFERENCE TO RELATED APPLICATIONS

This patent application is a national stage application of International Patent Application No. PCT/CN2022/111119, filed on Aug. 9, 2022, which claims the benefit and priority of Chinese Patent Application No. 202210054643.9, filed with the China National Intellectual Property Administration on Jan. 18, 2022, the disclosure of which is incorporated by reference herein in its entirety as part of the present application.

TECHNICAL FIELD

The present disclosure relates to the field of material processing, in particular to a high-temperature rolling processing method and processing device, and an application of the high-temperature rolling processing device.

BACKGROUND

At present, the toughening methods for low-toughness materials mainly include particle toughening, fiber whisker toughening, phase transformation toughening, residual stress toughening and other methods. Taking ceramic materials as an example, the fracture toughness of ceramic materials is low, and micro-cracks are easily introduced into the surface of the material during in the processing and using processes. In the using process, cracks may be produced and expanded, so that the reliability of materials is seriously reduced. In the prior art, one of the methods for mechanical modification of ceramic materials is to introduce a residual compressive stress layer on the ceramic surface through chemical treatment, heat treatment, shot peening and other technologies. The residual compressive stress layer introduced by chemical treatment is very thin, the strengthening effect on the material is limited, and other properties of the material can be influenced. Heat treatment and shot peening technology can only modify some materials. Due to the influence of process stability, new crack defects are easily introduced into the surface of the material during treatment, so that the dispersion of mechanical properties of the is greater. Therefore, for low-toughness materials, it is difficult to avoid crack initiation without changing the original materials in the existing toughening methods. Therefore, it is necessary to propose a universal process for low-toughness materials to solve the above existing problems.

SUMMARY

The purpose of the present disclosure is to provide a high-temperature rolling processing method and processing device, and an application of the high-temperature rolling processing device so as to solve the problem that the surface treatment effect of low-toughness materials is low in the prior art.

In order to solve the technical problem, a first solution provided by the present disclosure is as follows. A high-temperature rolling processing method includes the following steps: heating a to-be-processed test piece to a preset temperature, maintaining the preset temperature, applying a preset pressure on a to-be-processed surface of the test piece, and periodically and repeatedly rolling the test piece; rolling the test piece for a preset time, and then cooling the test piece to room temperature to obtain a test piece with a residual compressive stress layer on the surface; and plastically deforming the test piece at the preset temperature without crack initiation, wherein the preset pressure and preset time are suitable for a thickness of the residual compressive stress layer to be formed on the surface of the test piece, and the preset temperature.

In order to solve the technical problem, a second solution provided by the present disclosure is as follows. A high-temperature rolling machining device includes a force loading assembly, a rolling assembly, a temperature control assembly and a carrying assembly. The temperature control assembly includes a temperature control box and a bearing platform, and the bearing platform is arranged in an inner cavity of the temperature control box. The carrying assembly includes a carrying vehicle arranged along the horizontal direction, a transmission rod and a first motor, the carrying vehicle is arranged on the bearing platform, one end of the transmission rod is connected with a side face of the carrying vehicle, the other end of the transmission rod penetrates through a side wall of the temperature control box and then is connected with a rotating shaft of the first motor, and the first motor is used for controlling the carrying vehicle to slide along the horizontal direction. The force loading assembly is arranged along the vertical direction, the bottom of the force loading assembly penetrates through the temperature control box and then is connected with the rolling assembly, and the bottom of the rolling assembly abuts against a to-be-processed test piece on the carrying vehicle for carrying out high-temperature rolling on the to-be-processed test piece. The high-temperature rolling processing device is used for carrying out the high-temperature rolling processing method in the first solution.

Preferably, the force loading assembly includes a force loading turntable, a first dowel bar, a force sensor, a second dowel bar, a third dowel bar, a second motor, an ultrasonic transducer and a water cooling assembly which are coaxially arranged. One end of the first dowel bar is connected with the center of the force loading turntable, and the other end of the first dowel bar is coaxially connected with the top of the second dowel bar. The force sensor sleeves the first dowel bar. The second dowel bar is of a tubular structure. One end of the third dowel bar penetrates through the bottom of the second dowel bar and then is connected with a rotating shaft of the second motor, and the other end of the third dowel bar penetrates through the temperature control box and then is connected with the rolling assembly. The ultrasonic transducer sleeves the third dowel bar and is located near the second dowel bar. The water cooling assembly sleeves the third dowel bar and is located between the ultrasonic transducer and the temperature control box. The second motor controls the third dowel bar to drive the rolling assembly to rotate along the axial direction.

Preferably, the ultrasonic transducer is electrically connected with an external ultrasonic control assembly. The ultrasonic control assembly includes a power amplifier and a signal generator. The power amplifier is electrically connected with the signal generator and the ultrasonic transducer respectively. The signal generator sends out a voltage signal and transmits the voltage signal to the power amplifier. The power amplifier amplifies the voltage signal and then transmits the voltage signal to the ultrasonic transducer.

The ultrasonic transducer sends out ultrasonic vibration and transmits the ultrasonic vibration to the rolling assembly through the third dowel bar.

Preferably, the rolling assembly includes a ball fixed part and a plurality of balls. The top of the ball fixed part is connected with the end, away from the second dowel bar, of the third dowel bar. The bottom of the ball fixed part is movably embedded with the balls. The balls abut against the to-be-processed test piece on the carrying vehicle, and high-temperature rolling is carried out on the to-be-processed test piece. During high-temperature rolling, the hardness of the ball is greater than that of the to-be-processed test piece.

Preferably, the high-temperature rolling processing device also includes a frame mechanism. The frame mechanism includes a plurality of support rods, a first fixed part, a second fixed part, a temperature control box supporting piece and a base. The support rods are all arranged along the vertical direction, and the first fixed part, the second fixed part, the temperature control box supporting piece and the base are all horizontally arranged and vertically and fixedly connected with the support rods. The first fixed part is arranged between the force loading turntable and the force sensor, and the first dowel rod movably penetrates through the middle part of the first fixed part. The second fixed part is fixedly connected with the second motor, and the second dowel rod and the third dowel rod both movably penetrate through the middle part of the second fixed part. The temperature control box supporting piece is connected with the bottom of the temperature control box and the bottom of the bearing platform.

Preferably, the carrying assembly also includes a motor control box and a control box supporting piece. The motor control box is electrically connected with the first motor and used for controlling the rotating speed and direction of the first motor and controlling the sliding velocity of the carrying vehicle. The control box supporting piece is connected with the support rods and used for bearing the first motor and the motor control box.

Preferably, the temperature control assembly also includes a temperature control device. The temperature control device is electrically connected with the temperature control box and used for controlling the temperature of the inner cavity of the temperature control box.

Preferably, the high-temperature rolling processing device also includes an atmosphere supply mechanism. The atmosphere supply mechanism includes a gas control box and a gas storage tank. The gas control box respectively communicates with inner cavities of the gas storage tank and the temperature control box through pipelines. The gas control box is used for controlling the export flow and flow rate of working gas in the gas storage tank.

In order to solve the technical problem, a third solution provided by the present disclosure is as follows. According to an application of the high-temperature rolling processing device based on the second solution, the high-temperature rolling processing device is applied to surface toughening of ceramic or semiconductor materials and improvement on electrical and thermal properties of the materials.

The present disclosure has the following beneficial effects. Different from the situation in the prior art, the present disclosure provides a high-temperature rolling processing method and processing device, and an application of the high-temperature rolling processing device. Through the cooperative arrangement of the force loading assembly, the rolling assembly, the temperature control assembly and the carrying assembly, accurate high-temperature rolling operation can be carried out on the surface of the to-be-processed test piece, the mechanical properties and electrical properties of the test piece after rolling treatment are remarkably improved, the thermal conductivity is remarkably reduced, and at the same time, crack initiation in the processing process is avoided.

Reference signs: 1, force loading assembly; 11, force loading turntable; 12, first dowel bar; 13, force sensor; 14, second dowel bar; 15, third dowel bar; 16, second motor; 17, ultrasonic transducer; 171, ultrasonic control assembly; 171a, power amplifier; 171b, signal generator; 18, water cooling assembly; 2, rolling assembly; 21, ball fixed part; 22, ball; 23, rolling rod; 24, rolling ball; 25, ball spindle; 3, temperature control assembly; 31, temperature control box; 32, bearing platform; 33, temperature control device; 4, carrying assembly; 41, carrying vehicle; 42, transmission rod; 43, first motor; 44, motor control box; 45, control box supporting piece; 5, frame mechanism; 51, support rod; 52, first fixed part; 53, second fixed part; 54, temperature control box supporting piece; 55, base; 6, atmosphere supply mechanism; 61, gas control box; 62, gas storage tank; 7, test piece; and 8, tubular test piece.

DETAILED DESCRIPTION OF THE EMBODIMENTS

The following clearly and completely describes the technical scheme in the embodiments of the present disclosure with reference to the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

For a first solution of the present disclosure, a high-temperature rolling processing method proposed by the present disclosure includes the following steps: heating a to-be-processed test piece to a preset temperature, maintaining the preset temperature, applying a preset pressure on a to-be-processed surface of the test piece, and periodically and repeatedly rolling the test piece; rolling the test piece for a preset time, and then cooling the test piece to room temperature to obtain a test piece with a residual compressive stress layer on the surface; and plastically deforming the test piece at the preset temperature without crack initiation, wherein the preset pressure and preset time are suitable for a thickness of the residual compressive stress layer to be formed on the surface of the test piece, and the preset temperature, preset pressure, preset time and other parameters are adaptively set according to the materials of the to-be-processed test piece.

Figure 1:
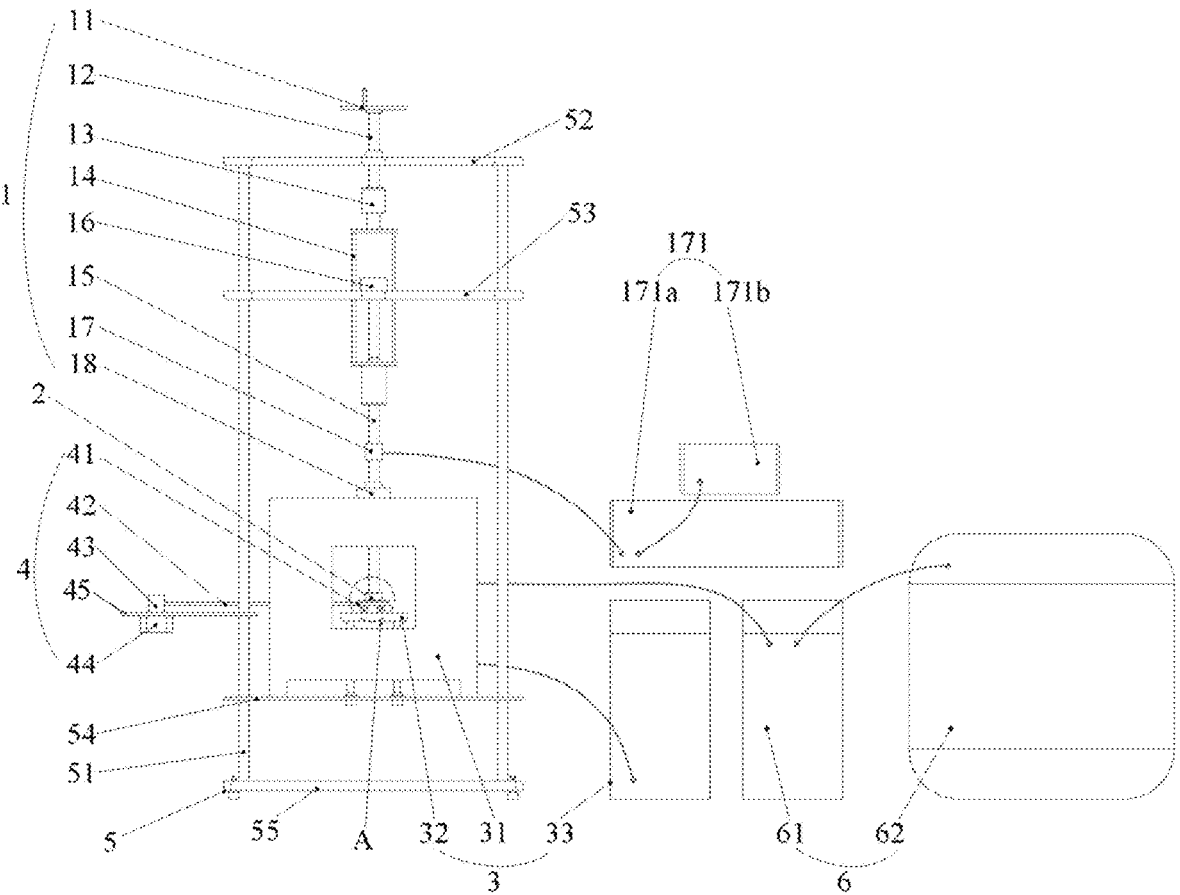
FIG. 1 is a structural schematic diagram of a high-temperature rolling material processing device in the first embodiment of the present disclosure.
Figure 2:
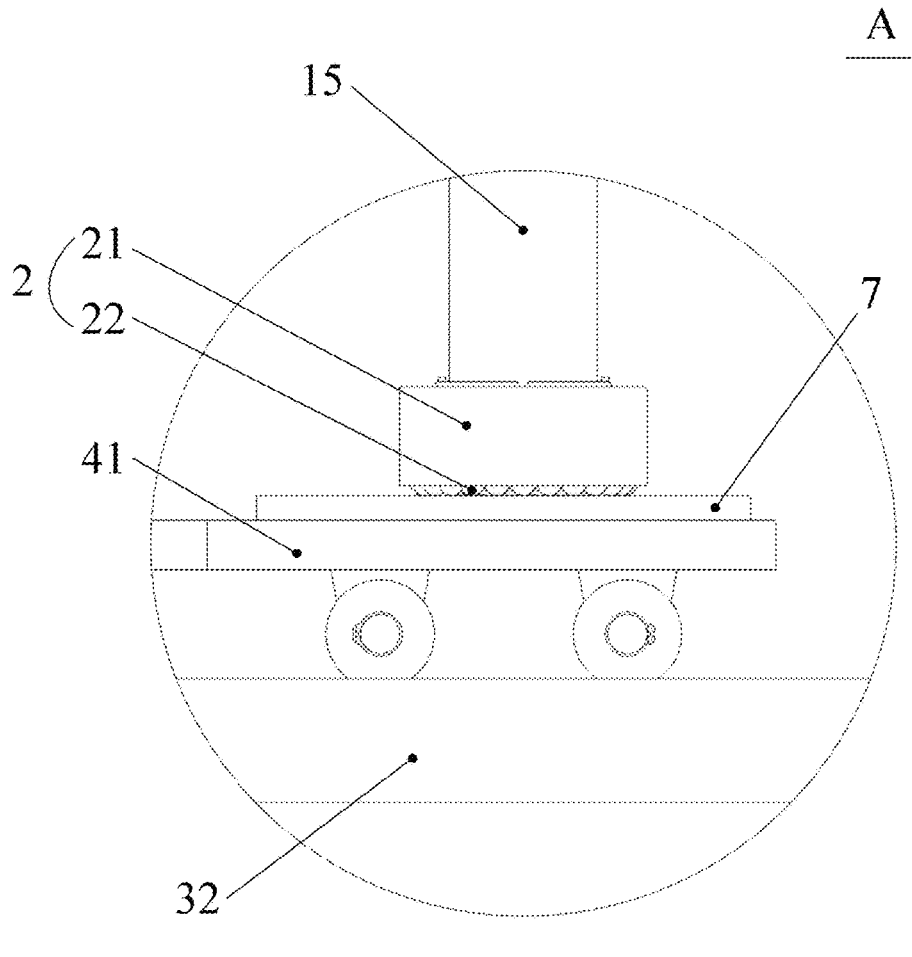
FIG. 2 is a detailed structural diagram of area A in FIG. 1.

For a second solution of the present disclosure, referring to FIG. 1 and FIG. 2, a high-temperature rolling processing device in the present disclosure includes a force loading assembly 1, a rolling assembly 2, a temperature control assembly 3, a carrying assembly 4 and a frame mechanism 5. The temperature control assembly 3 includes a temperature control box 31 and a bearing platform 32. The bearing platform 32 is arranged in an inner cavity of the temperature control box 31, and the temperature of the inner cavity is controlled by the temperature control assembly 3. The carrying assembly 4 includes a carrying vehicle 41 arranged along the horizontal direction, a transmission rod 42 and a first motor 43. The carrying vehicle 41 is arranged on the bearing platform 32. One end of the transmission rod 42 is connected with a side face of the carrying vehicle 41, and the other end of the transmission rod 42 penetrates through a side wall of the temperature control box 31 and then is connected with a rotating shaft of the first motor 43. The first motor 43 is used for controlling the carrying vehicle 41 to slide along the horizontal direction. The force loading assembly 1 is arranged along the vertical direction. The bottom of the force loading assembly 1 penetrates through the temperature control box 31 and then is connected with the rolling assembly 2. The bottom of the rolling assembly 2 abuts against a to-be-processed test piece 7 on the carrying vehicle 41 for carrying out high-temperature rolling on the to-be-processed test piece 7 to complete plastic treatment on the surface of the test piece 7. When the temperature is reduced to room temperature, a thicker residual compressive stress layer can be formed on the surface of the test piece than traditional methods, and then the mechanical properties, such as strength, hardness, fracture toughness and wear resistance, of the material are improved. At the same time, crack initiation during processing is effectively avoided. Each component of the high-temperature rolling processing device in the present disclosure is described in detail below.

Specifically, the force loading assembly 1 includes a force loading turntable 11, a first dowel bar 12, a force sensor 13, a second dowel bar 14, a third dowel bar 15, a second motor 16, an ultrasonic transducer 17 and a water cooling assembly 18 which are coaxially arranged. One end of the first dowel bar 12 is connected with the center of the force loading turntable 11, and the other end of the first dowel bar 12 is coaxially connected with the top of the second dowel bar 14. The force sensor 13 sleeves the first dowel bar 12 and is used for measuring the amplitude of applied force in real time. The second dowel bar 14 is of a tubular structure. One end of the third dowel bar 15 penetrates through the bottom of the second dowel bar 14 and then is connected with a rotating shaft of the second motor 16, and the other end of the third dowel bar 15 penetrates through the temperature control box 31 and then is connected with the rolling assembly 2. The ultrasonic transducer 17 sleeves the third dowel bar 15 and is located near the second dowel bar 14. The water cooling assembly 18 sleeves the third dowel bar 15 and is located between the ultrasonic transducer 17 and the temperature control box 31. The temperature of the inner cavity of the temperature control box 31 is blocked by the water cooling assembly 18, so that high-temperature conduction is prevented from affecting normal operation of the ultrasonic transducer 17.

In the force loading assembly 1, force to be applied to the test piece 7 is adjusted by rotating the force loading turntable 11, and the third dowel bar 15 is controlled by the second motor 16 to drive the rolling assembly 2 to rotate along the axial direction, so that the surface of the test piece 7 can be uniformly rolled by the rolling assembly 2.

In the embodiment, the ultrasonic transducer 17 is a general Langevin piezoelectric ceramic transducer, and has a core element made of PZT piezoelectric ceramic P8. The ultrasonic transducer 17 is electrically connected with an external ultrasonic control assembly 171. The ultrasonic control assembly 171 includes a power amplifier 171a and a signal generator 171b. The power amplifier 171a is electrically connected with the signal generator 171b and the ultrasonic transducer 17 respectively. The signal generator 171b sends out a voltage signal and transmits the voltage signal to the power amplifier 171a. The power amplifier 171a amplifies the voltage signal and then transmits the voltage signal to the ultrasonic transducer 17. The ultrasonic transducer 17 sends out ultrasonic vibration and transmits the ultrasonic vibration to the rolling assembly 2 through the third dowel bar 15, so that when the surface of the test piece 7 is rolled by the rolling assembly 2, slight ultrasonic vibration is supplemented, so that the surface of the test piece 7 is more flat.

Specifically, the rolling assembly 2 includes a ball fixed part 21 and a plurality of balls 22. The top of the ball fixed part 21 is connected with the end, away from the second dowel bar 14, of the third dowel bar 15. The bottom of the ball fixed part 21 is movably embedded with the balls 22. The balls 22 abut against the to-be-processed test piece 7 on the carrying vehicle 41, and high-temperature rolling is carried out on the to-be-processed test piece 2. In the ball rolling method adopted in the embodiment, high-temperature hard balls such as silicon nitride balls, silicon carbide balls, boron carbide balls, silicon boride balls preferably serve as the balls 22. In other embodiments, the test piece 7 can also be rolled by other methods such as roller rolling, which is not limited herein.

Specifically, the frame mechanism 5 includes a plurality of support rods 51, a first fixed part 52, a second fixed part 53, a temperature control box supporting piece 54 and a base 55. The force loading assembly 1, the rolling assembly 2, the temperature control assembly 3 and the carrying assembly 4 are supported and fixed by the frame mechanism 5. The support rods 51 are all arranged along the vertical direction. The first fixed part 52, the second fixed part 53, the temperature control box supporting piece 54 and the base 55 are all horizontally arranged and vertically and fixedly connected with the support rods 51. The first fixed part 52 is arranged between the force loading turntable 11 and the force sensor 13, and the first dowel rod 12 movably penetrates through the middle part of the first fixed part 52. The first dowel rod 12 is restricted by the first fixed part 52 to move only along the vertical direction. The second fixed part 53 is fixedly connected with the second motor 16, and the second dowel rod 14 and the third dowel rod 15 both movably penetrate through the middle part of the second fixed part 53. The second motor 16 is fixed by the second fixed part 53. At the same time, the second dowel bar 14 and the third dowel bar 15 are restricted to move only along the vertical direction. The temperature control box supporting piece 54 is connected with the bottom of the temperature control box 31 and the bottom of the bearing platform 32 and used for fixing the temperature control box 31 and the bearing platform 32.

Specifically, the carrying assembly 4 also includes a motor control box 44 and a control box supporting piece 45. The motor control box 44 is electrically connected with the first motor 43 and used for controlling the rotating speed and direction of the first motor 43 and controlling the sliding velocity of the carrying vehicle 41. Under the control of the motor control box 44, the carrying vehicle 41 can slide unidirectionally or in a reciprocating manner. The sliding manner of the carrying vehicle 41 is tightly related to rolling requirements of the test piece. Adaptive arrangement is needed according to actual demands, which is not limited here. The control box supporting piece 45 is connected with the support rods 51 and used for bearing the first motor 43 and the motor control box 44.

Specifically, the temperature control assembly 3 also includes a temperature control device 33. The temperature control device is 33 is electrically connected with the temperature control box 31 and used for controlling the temperature of the inner cavity of the temperature control box 31. In the embodiment, the temperature control device 33 is composed of a temperature sensor, a transformer, an electromagnetic relay, a PID (Proportion Integral Differential) control circuit and a display instrument. The temperature in the temperature control box 31 is collected by the temperature sensor, electric pulse is controlled by the electromagnetic relay, the PID control circuit controls the heating process, and the display instrument can display the temperature in the temperature control box in real time, so that accurate control for the temperature of the inner cavity of the temperature control box 31 is realized. In other embodiments, the suitable temperature control device can be designed according to actual demands, which is not limited here.

Specifically, the high-temperature rolling processing device also includes an atmosphere supply mechanism 6. The atmosphere supply mechanism 6 includes a gas control box 61 and a gas storage tank 62. The gas control box 61 respectively communicates with inner cavities of the gas storage tank 62 and the temperature control box 31 through pipelines. The gas control box 61 is used for controlling the export flow and flow rate of working gas in the gas storage tank 62. In the embodiment, the atmosphere supply mechanism 6 is added, mainly considering that some test piece materials need to be processed in a protective gas environment when being processed at high temperature. Whether the atmosphere supply mechanism 6 is selected or not can be adaptively selected according to actual processing requirements, which is not limited here.

Further, based on the high-temperature rolling processing method in the first solution, the specific operation process of the high-temperature rolling processing device is described. The high-temperature rolling processing device is applied to surface toughening of ceramic or semiconductor materials and improvement on electrical and thermal properties of the materials. Taking the flaky material as an example, the specific application includes the following steps:

Firstly, placing the to-be-processed test piece on the carrying vehicle, and controlling the temperature control box at a preset temperature at a rate of 0.5-5° C./min. The to-be-processed test piece is located at the preset temperature, and it is necessary to meet the conditions that plastic deformation can occur without crack initiation, that is, it is necessary to select a preset temperature suitable for specific test piece materials, and the specific value of the preset temperature is not limited here.

(2) maintaining the preset temperature, controlling the force loading assembly to apply the preset pressure, controlling the rolling assembly to rotate at a preset rotating speed, and controlling the carrying vehicle to reciprocate during a preset sliding period. The preset rotating speed is 10 to 60 r/min, and the preset sliding period is 1 min.

(3) after the to-be-processed test piece is rolled for a preset time, controlling the temperature control box to be cooled to room temperature at a rate of 2° C./min to obtain the test piece with a residual compressive stress layer on the surface. The preset pressure and preset time are suitable for the thickness of the residual compressive stress layer to be formed on the surface of the test piece.

In the surface toughening process of ceramic materials, the preset temperature, preset rotating speed and preset sliding period are limited. The surface of the test piece is repeatedly rolled by the above-mentioned device with a high-temperature and low-speed rolling method in a high-temperature environment, and the residual compressive stress layer is formed on the surface of the sample after cooling to room temperature through physical processes such as dislocation nucleation, movement, atomic migration and grain recombination. The traditional shot peening toughening method is high in speed and great in impulse, and the ceramic surface is easy to damage. However, static pressure applied to the test piece can well overcome the shortcomings of the traditional process, and the overall toughening process is slow, so that the ceramic surface structure is avoided from being damaged in the toughening process. In addition, through experimental study, it is found that the main influencing factors of the thickness of the residual compressive stress layer on the surface of the test piece are preset pressure and preset time, and the specific influencing factors also include the rolling contact area of the rolling assembly and the output frequency of the ultrasonic transducer. By adjusting the above influencing factors, the thickness and dislocation density of the residual compressive stress layer can be accurately controlled, and the adaptive process parameters need to be selected according to the actual needs, which is not limited here.

Figure 4:
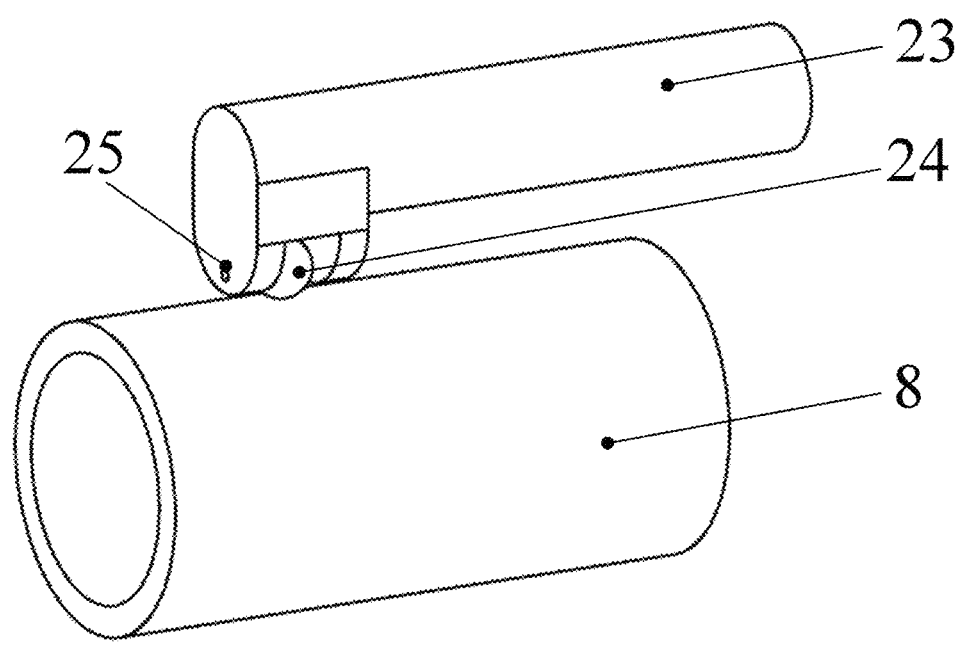
FIG. 4 is a three-dimensional structural schematic diagram after a rolling assembly is improved in the present disclosure.
Figure 5:
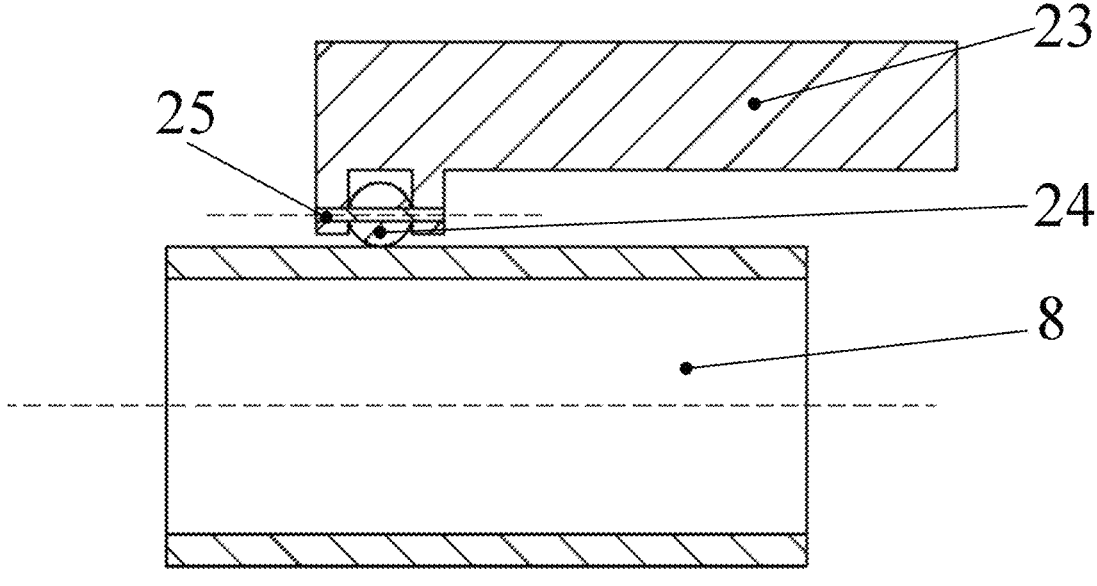
FIG. 5 is a schematic diagram of high-temperature rolling treatment on an outer wall of a tubular test piece after the rolling assembly is improved in the present disclosure.
Figure 6:
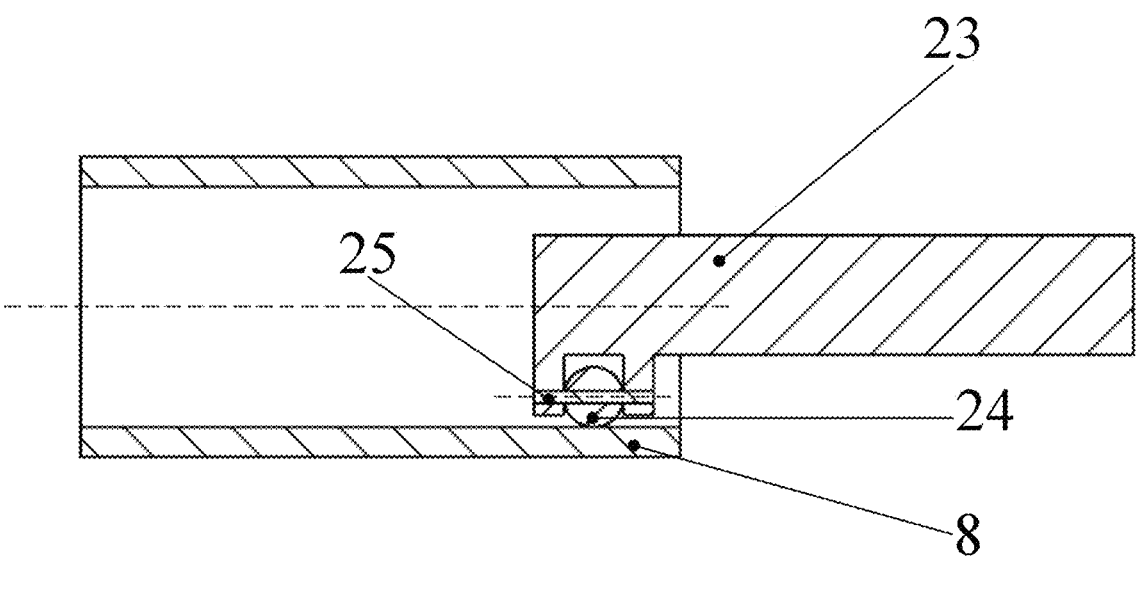
FIG. 6 is a schematic diagram of high-temperature rolling treatment on an inner wall of the tubular test piece after the rolling assembly is improved in the present disclosure.

It should be pointed out that although the specific processing mode of flaky materials is described in detail in the present disclosure, the above-mentioned high-temperature rolling processing method can also perform similar processing on the surfaces of test pieces with different configurations, such as axial surfaces and holes, and the residual compressive stress layer is formed. Referring to FIG. 4 to FIG. 6, adaptive improvement on the high-temperature rolling processing device is shown, mainly reflecting the improvement on the rolling assembly, so that the processing of the tubular test piece 8 is adapted. In the embodiment, the rolling assembly consists of a rolling rod 23, a rolling ball 24 and a ball spindle 25. A groove for the rolling ball 24 to rotate is formed in one side of the end of the rolling rod 23. The ball spindle 25 penetrates through the rolling ball 24 and then both ends of the ball spindle 25 are connected with the rolling rod, so that the rolling ball 24 can slightly protrude from a lateral groove of the rolling rod 24, and then the outer wall or the inner wall of the tubular test piece 8 can be rolled at high temperature. The specific operation process is similar to the above process, which is not described here. Therefore, the high-temperature rolling processing method is not limited to the processing of flaky materials, and also can process test pieces with other surface configurations. According to the actual surface morphology of the processed test piece, the process parameters and devices can be adjusted adaptively, and are not listed here.

The processing effect of the high-temperature rolling processing device is described in detail by specific embodiments.

Embodiment I

In the embodiment, the to-be-processed test piece 7 is made of alumina ceramic, and silicon carbide balls are selected as the balls 22. Firstly, the test piece 7 is placed on the carrying vehicle 41, and the temperature control device 33 is controlled so that the temperature of the inner cavity of the temperature control box 31 rise to the preset temperature at a rate of 5° C./min. After the preset temperature is reached, the force of the test piece 7 is monitored in real time by the force sensor 13, and the force loading turntable 11 is rotated to adjust the applied force to the preset pressure. At the same time, the water cooling module 18 is turned on to prevent high temperature conduction of the temperature control box 31 from affecting the ultrasonic transducer 17.

by using the high-temperature rolling processing device, and crack initiation during the processing process can be effectively avoided. At the same time, it is also indicated that the set parameters, including preset temperature of 800° C. to 1000° C., preset pressure of 100 N and preset time of 4 h, have a good treatment effect on aluminum oxide ceramics.

TABLE 1

| Test piece materials | Initial performances | | | High-temperature rolling treatment parameters | | | Performances after high-temperature rolling treatment | | |
|---|---|---|---|---|---|---|---|---|---|
| | Strength (MPa) | Hardness (GPa) | Fracture toughness (MPa · m$^{1/2}$) | Preset temperature (° C.) | Preset pressure (N) | Preset time (h) | Strength (MPa) | Hardness (GPa) | Fracture toughness (MPa · m$^{1/2}$) |
| Aluminum | 360 | 13.2 | 3.1 | 800 | 100 | 4 | 420 | 14 | 4.8 |
| oxide | 360 | 13.2 | 3.1 | 900 | 100 | 4 | 430 | 14.5 | 5.0 |
| ceramics | 360 | 13.2 | 3.1 | 1000 | 100 | 4 | 415 | 14.1 | 4.7 |

Figure 3:
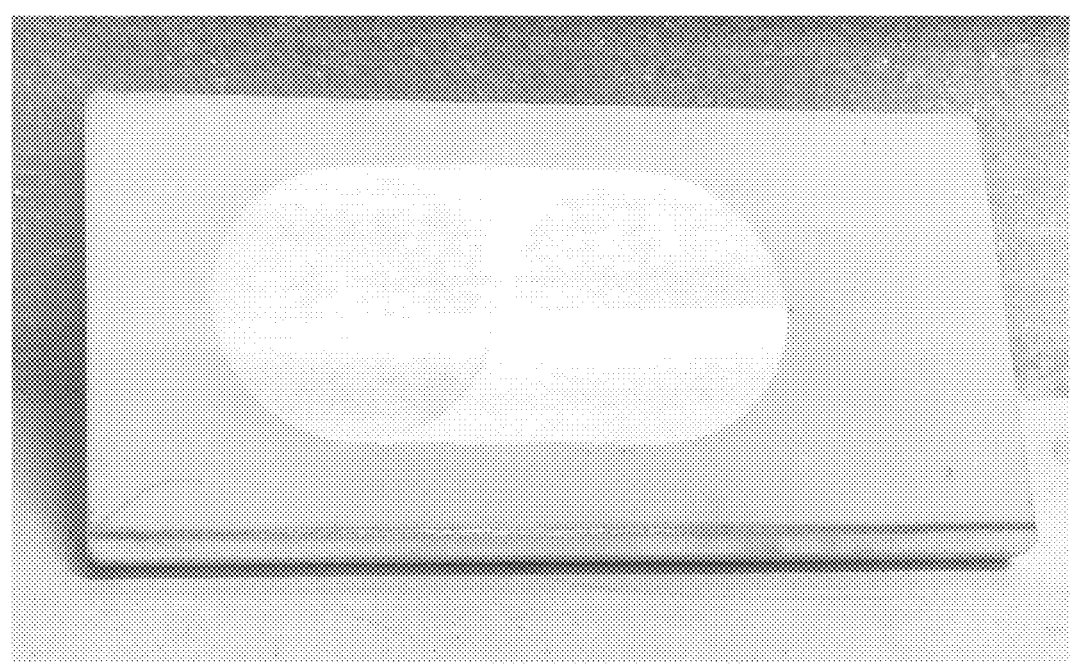
FIG. 3 is an effect diagram for processing an aluminum oxide ceramic plate in the first embodiment of the present disclosure.

Then, the second motor 16 is started, so that the third dowel bar 15 drives the rolling assembly 2 to rotate along the axial direction, so that the balls 22 uniformly roll on the surface of the test piece, and the rolling speed is gradually increased from zero to 60 rpm. At the same time, the first motor 43 is started, so that the transmission rod 42 drives the carrying vehicle 41 to reciprocate along the horizontal direction, so that the rolling area of the test piece 7 is extended. At the same time, the signal generator 171b is turned on to send out a voltage signal to be transmitted to the power amplifier 171a to amplify the voltage signal, and then the voltage signal is transmitted to the ultrasonic transducer 17. The ultrasonic transducer 17 sends out ultrasonic vibration and transmits the voltage signal to the rolling assembly 2 through the third dowel bar 15, so that the test piece 7 is synchronously subjected to ultrasonic vibration during rolling, and the rolling surface is more flat. After rolling for the preset time, the temperature of the temperature control box is slowly lowered to room temperature at a rate of 2° C./min to complete the rolling treatment, and the processing effect of the obtained test piece is as shown in FIG. 3.

In the embodiment, the preset temperature is set in the range of 800° C. to 1000° C., the preset pressure is set to be 100 N, and the preset time is set to be 4 h. Three preset temperatures of 800° C., 900° C. and 1000° C. are selected for the high-temperature rolling treatment and testing. If the test results are as shown in Table 1, the test results show that the surface roughness of the treated alumina ceramics is

Embodiment II

In the embodiment, the to-be-processed test piece 7 is made of zirconia ceramics, the high-temperature rolling treatment process is similar to that in the first embodiment, and the main difference lies in that the treatment parameters are adjusted. Specifically, the preset temperature is set in the range of 800° C. to 1200° C., the preset pressure is set to be 120 N, and the preset time is set to be 4 h. Three preset temperatures of 800° C., 1000° C. and 1200° C. are selected for the high-temperature rolling treatment and testing. If the test results are as shown in Table 2, the test results show that the surface roughness after treatment is obviously improved, the bending strength is improved by about 25%, the hardness is improved by about 5%, the fracture toughness is improved by more than 26%, the wear resistance is also improved significantly, and no cracks are produced. It is proved that the mechanical properties, such as strength, hardness, fracture toughness and wear resistance, of ionic and covalent bonding compound materials can be improved by using the high-temperature rolling processing device, and crack initiation during the processing process can be effectively avoided. At the same time, it is also indicated that the set parameters, including preset temperature of 800° C. to 1200° C., preset pressure of 120 N and preset time of 4 h, have a good treatment effect on zirconium ceramics.

TABLE 2

| Test piece materials | Initial performances | | | High-temperature rolling treatment parameters | | | Performances after high-temperature rolling treatment | | |
|---|---|---|---|---|---|---|---|---|---|
| | Strength (MPa) | Hardness (GPa) | Fracture toughness (MPa · m$^{1/2}$) | Preset temperature (° C.) | Preset pressure (N) | Preset time (h) | Strength (MPa) | Hardness (GPa) | Fracture toughness (MPa · m$^{1/2}$) |
| Zirconia | 560 | 14.3 | 8.6 | 800 | 120 | 4 | 690 | 14.8 | 10.9 |
| ceramics | 560 | 14.3 | 8.6 | 1000 | 120 | 4 | 700 | 15.0 | 11.3 |
| | 560 | 14.3 | 8.6 | 1200 | 120 | 4 | 701 | 15.1 | 11.5 | obviously improved, and Ra is reduced from 3 μm to 0.4 μm; and the bending strength is improved by about 17%, the hardness is improved by about 10%, the fracture toughness is improved by more than 50%, the wear resistance is also improved significantly, and no cracks are produced. It is proved that the mechanical properties, such as strength, hardness, fracture toughness and wear resistance, of ionic and covalent bonding compound materials can be improved

Embodiment III

In the embodiment, the to-be-processed test piece 7 is made of plumbum zirconate titanate (PZT5), the high-temperature rolling treatment process is similar to that in the first embodiment, and the main difference lies in that the treatment parameters are adjusted. Specifically, the preset temperature is set in the range of 800° C. to 1000° C., the preset pressure is set to be 50 N, and the preset time is set to be 4 h. Three preset temperatures of 800° C., 900° C. and 1000° C. are selected for the high-temperature rolling treatment and testing. If the test results are as shown in Table 3, the test results show that the surface roughness after treatment is obviously improved, the bending strength is improved by about 17%, the hardness is improved by about 4.5%, the fracture toughness is improved by more than 22%, the wear resistance is also improved significantly, and no cracks are produced. It is proved that the mechanical prop- erties, such as strength, hardness, fracture toughness and wear resistance, of ionic and covalent bonding compound materials can be improved by using the high-temperature rolling processing device, and crack initiation during the processing process can be effectively avoided. At the same time, it is also indicated that the set parameters, including preset temperature of 800° C. to 1000° C., preset pressure of 50 N and preset time of 4 h, have a good treatment effect on plumbum zirconate titanate (PZT5).

TABLE 3

| Test piece materials | Initial performances | | | High-temperature rolling treatment parameters | | | Performances after high-temperature rolling treatment | | |
|---|---|---|---|---|---|---|---|---|---|
| | Strength (MPa) | Hardness (GPa) | Fracture toughness (MPa · m$^{1/2}$) | Preset temperature (° C.) | Preset pressure (N) | Preset time (h) | Strength (MPa) | Hardness (GPa) | Fracture toughness (MPa · m$^{1/2}$) |
| Plumbum zirconate titanate (PZT5) | 70 | 3.4 | 0.9 | 800 | 50 | 4 | 76 | 3.5 | 1.1 |
| | 70 | 3.4 | 0.9 | 900 | 50 | 4 | 82 | 3.55 | 1.15 |
| | 70 | 3.4 | 0.9 | 1000 | 50 | 4 | 90 | 3.56 | 1.2 |

Embodiment IV

In the embodiment, the to-be-processed test piece 7 is made of barium titanate ceramics (BTO), the high-tempera- ture rolling treatment process is similar to that in the first embodiment, and the main difference lies in that the treat- ment parameters are adjusted. Specifically, the preset tem- perature is set in the range of 800° C. to 1000° C., the preset pressure is set to be 40 N, and the preset time is set to be 4 h. Three preset temperatures of 800° C., 900° C. and 1000° C. are selected for the high-temperature rolling treatment and testing. If the test results are as shown in Table 4, the test results show that the surface roughness after treatment is obviously improved, the bending strength is improved by about 18%, the hardness is improved by about 14%, the fracture toughness is improved by more than 36%, the wear resistance is also improved significantly, and no cracks are produced. It is proved that the mechanical properties, such as strength, hardness, fracture toughness and wear resis- tance, of ionic and covalent bonding compound materials can be improved by using the high-temperature rolling processing device, and crack initiation during the processing process can be effectively avoided. At the same time, it is also indicated that the set parameters, including preset temperature of 800° C. to 1000° C., preset pressure of 40 N and preset time of 4 h, have a good treatment effect on barium titanate ceramics (BTO).

TABLE 4

| Test piece materials | Initial performances | | | High-temperature rolling treatment parameters | | | Performances after high-temperature rolling treatment | | |
|---|---|---|---|---|---|---|---|---|---|
| | Strength (MPa) | Hardness (GPa) | Fracture toughness (MPa · m$^{1/2}$) | Preset temperature (° C.) | Preset pressure (N) | Preset time (h) | Strength (MPa) | Hardness (GPa) | Fracture toughness (MPa · m$^{1/2}$) |
| Barium titanate ceramics (BTO) | 55 | 4.2 | 0.7 | 800 | 40 | 4 | 60 | 4.5 | 0.95 |
| | 55 | 4.2 | 0.7 | 900 | 40 | 4 | 65 | 4.8 | 0.98 |
| | 55 | 4.2 | 0.7 | 1000 | 40 | 4 | 68 | 4.9 | 1.02 |

In addition, electrical and thermal tests are carried out on the test pieces processed in the first embodiment. It is found that the electrical conductivity of alumina ceramics is increased by 28% and the thermal conductivity is decreased by 16% after the rolling treatment. Therefore, the electrical properties and thermal conductivity of the materials can be improved after the surface treatment of ionic and covalent bonding compounds with the high-temperature rolling treatment device, so the rolling processing parameters can also be designed according to the improvement requirements of electrical properties and thermal conductivity. Specifically, the electrical conductivity or thermal conductivity of the preset material needs to be adapted to the thickness of the residual compressive stress layer and dislocation density formed on the surface of the test piece, and is not specifically limited here.

Different from the situation in the prior art, the present disclosure provides a high-temperature rolling processing method and processing device, and an application of the high-temperature rolling processing device. Through the cooperative arrangement of the force loading assembly, the rolling assembly, the temperature control assembly and the carrying assembly, accurate high-temperature rolling operation can be carried out on the surface of the to-be-processed test piece, the mechanical properties and electrical properties of the test piece after rolling treatment are remarkably improved, the thermal conductivity is remarkably reduced, and at the same time, crack initiation in the processing process is avoided. In addition, the electrical properties and thermal conductivity of materials can also be adjusted according to requirements.

The above embodiments only express embodiments of the present disclosure, and the description is specific and detailed, but cannot be construed as limiting the claims of the present disclosure. It should be noted that several modifications and improvements may also be made to those skilled in the art without departing from the inventive concept, which fall within the scope of the present disclosure. Therefore, the protection scope of the present disclosure shall be subject to the protection scope of the claims.

What is claimed is:

1. A high-temperature rolling processing method, comprising the following steps:

heating a to-be-processed test piece to a preset temperature, maintaining the preset temperature, using balls of which the hardness is greater than that of the to-be-processed test piece at the temperature, applying a preset pressure on a to-be-processed surface of the test piece, and periodically and repeatedly rolling the test piece;

rolling the test piece for a preset time, and then cooling the test piece to room temperature to obtain a test piece with a residual compressive stress layer on the surface; and plastically deforming the test piece at the preset temperature without crack initiation, wherein the preset pressure and preset time are suitable for a thickness of the residual compressive stress layer to be formed on the surface of the test piece.

2. A high-temperature rolling processing device, comprising a force loading assembly, a rolling assembly, a temperature control assembly and a carrying assembly, wherein the temperature control assembly comprises a temperature control box and a bearing platform, and the bearing platform is arranged in an inner cavity of the temperature control box;

the carrying assembly comprises a carrying vehicle arranged along a horizontal direction, a transmission rod and a first motor, one end of the transmission rod is connected with a side face of the carrying vehicle, the other end of the transmission rod penetrates through a side wall of the temperature control box and then is connected with a rotating shaft of the first motor, and the first motor is used for controlling the carrying vehicle to slide along the horizontal direction;

the force loading assembly is arranged along a vertical direction, the bottom of the force loading assembly penetrates through the temperature control box and then is connected with the rolling assembly, and the bottom of the rolling assembly abuts against a to-be-processed test piece on the carrying vehicle for carrying out high-temperature rolling on the to-be-processed test piece; and the high-temperature rolling processing device is used for the high-temperature rolling processing method according to claim 1.

3. The high-temperature rolling processing device according to claim 2, wherein the force loading assembly comprises a force loading turntable, a first dowel bar, a force sensor, a second dowel bar, a third dowel bar, a second motor, and a water cooling assembly which are coaxially arranged;

one end of the first dowel bar is connected with the center of the force loading turntable, the other end of the first dowel bar is coaxially connected with the top of the second dowel bar, and the force sensor sleeves the first dowel bar;

the second dowel bar is of a tubular structure, one end of the third dowel bar penetrates through the bottom of the second dowel bar and then is connected with a rotating shaft of the second motor, and the other end of the third dowel bar penetrates through the temperature control box and then is connected with the rolling assembly; and the second motor controls the third dowel bar to drive the rolling assembly to rotate along an axial direction.

4. The high-temperature rolling processing device according to claim 2, wherein the rolling assembly comprises a ball fixed part and a plurality of balls, the top of the ball fixed part is connected with the end, away from the second dowel bar, of the third dowel bar, the bottom of the ball fixed part is movably embedded with the balls, the balls abut against the to-be-processed test piece on the carrying vehicle, and high-temperature rolling is carried out on the to-be-processed test piece; and during high-temperature rolling, the hardness of the ball is greater than that of the to-be-processed test piece.

5. The high-temperature rolling processing device according to claim 3, wherein the high-temperature rolling processing device also comprises a frame mechanism, the frame mechanism comprises a plurality of support rods, a first fixed part, a second fixed part, a temperature control box supporting piece and a base;

the support rods are all arranged along the vertical direction, and the first fixed part, the second fixed part, the temperature control box supporting piece and the base are all horizontally arranged and vertically and fixedly connected with the support rods;

the first fixed part is arranged between the force loading turntable and the force sensor, and the first dowel bar movably penetrates through the middle part of the first fixed part;

the second fixed part is fixedly connected with the second motor, and the second dowel bar and the third dowel bar both movably penetrate through the middle part of the second fixed part; and the temperature control box supporting piece is connected with the bottom of the temperature control box and the bottom of the bearing platform.

6. The high-temperature rolling processing device according to claim 5, wherein the carrying assembly also comprises a motor control box and a control box supporting piece, the motor control box is electrically connected with the first motor and used for controlling the rotating speed and direction of the first motor and controlling the sliding velocity of the carrying vehicle; and the control box supporting piece is connected with the support rods and used for bearing the first motor and the motor control box.

7. The high-temperature rolling processing device according to claim 2, wherein the temperature control assembly also comprises a temperature control device, and the temperature control device is electrically connected with the temperature control box and used for controlling the temperature of the inner cavity of the temperature control box.

8. The high-temperature rolling processing device according to claim 2, wherein the high-temperature rolling processing device also comprises an atmosphere supply mechanism, the atmosphere supply mechanism comprises a gas control box and a gas storage tank, the gas control box respectively communicates with inner cavities of the gas storage tank and the temperature control box through pipelines, and the gas control box is used for controlling the export flow and flow rate of working gas in the gas storage tank.

9. A method of using a high temperature rolling processing device, the high temperature rolling processing device comprising:

a force loading assembly, a rolling assembly, a temperature control assembly and a carrying assembly, wherein the temperature control assembly comprises a temperature control box and a bearing platform, and the bearing platform is arranged in an inner cavity of the temperature control box;

the carrying assembly comprises a carrying vehicle arranged along a horizontal direction, a transmission rod and a first motor, one end of the transmission rod is connected with a side face of the carrying vehicle, the other end of the transmission rod penetrates through a side wall of the temperature control box and then is connected with a rotating shaft of the first motor, and the first motor is used for controlling the carrying vehicle to slide along the horizontal direction;

the force loading assembly is arranged along a vertical direction, the bottom of the force loading assembly penetrates through the temperature control box and then is connected with the rolling assembly, and the bottom of the rolling assembly abuts against a to-be-processed test piece on the carrying vehicle for carrying out high-temperature rolling on the to-be-processed test piece; and wherein the high-temperature rolling processing device is applied to surface toughening of ceramic or semiconductor materials and improvement on electrical and thermal properties of the materials.

10. The method according to claim 9, wherein the force loading assembly comprises a force loading turntable, a first dowel bar, a force sensor, a second dowel bar, a third dowel bar, a second motor and a water cooling assembly which are coaxially arranged;

one end of the first dowel bar is connected with the center of the force loading turntable, the other end of the first dowel bar is coaxially connected with the top of the second dowel bar, and the force sensor sleeves the first dowel bar;

the second dowel bar is of a tubular structure, one end of the third dowel bar penetrates through the bottom of the second dowel bar and then is connected with a rotating shaft of the second motor, and the other end of the third dowel bar penetrates through the temperature control box and then is connected with the rolling assembly; and the second motor controls the third dowel bar to drive the rolling assembly to rotate along an axial direction.

11. The method according to claim 9, wherein the rolling assembly comprises a ball fixed part and a plurality of balls, the top of the ball fixed part is connected with the end, away from the second dowel bar, of the third dowel bar, the bottom of the ball fixed part is movably embedded with the balls, the balls abut against the to-be-processed test piece on the carrying vehicle, and high-temperature rolling is carried out on the to-be-processed test piece; and during high-temperature rolling, the hardness of the ball is greater than that of the to-be-processed test piece.

12. The method according to claim 10, wherein the high-temperature rolling processing device also comprises a frame mechanism, the frame mechanism comprises a plurality of support rods, a first fixed part, a second fixed part, a temperature control box supporting piece and a base;

the support rods are all arranged along the vertical direction, and the first fixed part, the second fixed part, the temperature control box supporting piece and the base are all horizontally arranged and vertically and fixedly connected with the support rods;

the first fixed part is arranged between the force loading turntable and the force sensor, and the first dowel bar movably penetrates through the middle part of the first fixed part;

the second fixed part is fixedly connected with the second motor, and the second dowel bar and the third dowel bar both movably penetrate through the middle part of the second fixed part; and the temperature control box supporting piece is connected with the bottom of the temperature control box and the bottom of the bearing platform.

13. The method according to claim 12, wherein the carrying assembly also comprises a motor control box and a control box supporting piece, the motor control box is electrically connected with the first motor and used for controlling the rotating speed and direction of the first motor and controlling the sliding velocity of the carrying vehicle; and the control box supporting piece is connected with the support rods and used for bearing the first motor and the motor control box.

14. The method according to claim 9, wherein the temperature control assembly also comprises a temperature control device, and the temperature control device is electrically connected with the temperature control box and used for controlling the temperature of the inner cavity of the temperature control box.

15. The method according to claim 9, wherein the high-temperature rolling processing device also comprises an atmosphere supply mechanism, the atmosphere supply mechanism comprises a gas control box and a gas storage tank, the gas control box respectively communicates with inner cavities of the gas storage tank and the temperature control box through pipelines, and the gas control box is used for controlling the export flow and flow rate of working gas in the gas storage tank.

* * * * *